United States Patent Office 3,851,080
Patented Nov. 26, 1974

3,851,080
FRESH MEAT IN A PREDOMINATELY CARBON DIOXIDE ENVIRONMENT
James R. Lugg, Salinas, and Ralph L. White, San Jose, Calif., assignors to Transfresh Corporation, Salinas, Calif.
No Drawing. Filed Sept. 14, 1972, Ser. No. 289,172
Int. Cl. A23b 1/00
U.S. Cl. 426—312    5 Claims

ABSTRACT OF THE DISCLOSURE

The instant invention is directed to an improved process for refrigerated storage or refrigerated shipment of fresh meat (or fresh fish) wherein the fresh meat is maintained in a contolled gaseous atmosphere of carbon dioxide about 35–75%; molecular oxygen, about 21–28%; and the remainder essentially molecular nitrogen, during the period of controlled storage or shipment. The fresh fish is stored or shipped in a controlled atmosphere of carbon dioxide, about 20–25%; molecular oxygen about 5–10%; and the remainder essentially nitrogen.

BACKGROUND OF THE INVENTION

(1) The field of the Invention

This invention relates to the refrigerated storage or refrigerated shipment of fresh meat. Particularly the invention is directed to such storage or shipment facilities affording a synthetic gaseous atmosphere.

(2) Description of the Prior Art

At the Twenty-Frst International Conference on *Handling Perishable Agricultural Commodities*, March 1967, K. E. Hoke, Market Quality Research Division, U.S. Department of Agriculture, delivered a paper entitled: Effect of Modified Atmospheres on Meat Quality. This paper was a summation of prior research on the use of synthetic gaseous atmospheres in the refrigerated storage of fresh meat. It is pointed out that the recommended temperature of refrigeration by the American Society of Heating, Refrigerating and Air Conditioning Engineers is 32–34° F.; and that a more desirable range is about 30–32° F. (The freezing point of fresh meat is given as 27.5° F.)

Hoke indicates that meat stored in a gaseous atmosphere having a $CO_2$ concentration of more than 20% rapidly loses its red color; fresh pork having less myoglobin than beef can tolerate a higher carbon dioxide concentration.

Hoke referred to research work being carried out in Finland under grants from the U.S.D.A. This was released in October 1971 in a paper entitled Influence of Carbon Dioxide and Nitrogen Atmospheres on Shelf Life of Refrigerated Meat by M.S. Pohja, Armi Alivaara and O. Sorsavirta of The Research Centre of the Meat Industry, Hameenlinna, Finland.

The salient findings of the Finnish workers were published in Western Meat Industry, September 1971, pp. 25 and 29, *How New $CO_2$ Process Tenderizes Beef and Extends Shelf Life of Steaks.*

The Finnish work on beef using an atmosphere containing 10%, 20%, 30% and 40% carbon dioxide and the remainder "air" showed that with increasing carbon dioxide, the time for formation of undesired odor and surface slime increased, but as the carbon dioxide increased the meat color tended to more quickly develop an unattractive gray cast. This confirms the color development finding of the earlier art reported on by Hoke, supra.

Thus, the prior art has gone toward extinguishing the amount of molecular oxygen ($O_2$) present in the storage atmosphere. The Finnish atmospheres, when converted to the individual gases present, were using air as $N_2$, 78%; $O_2$, 21%; $CO_2$, 0.03%; and argon and other gases, about 1%, where argon and others are lumped with $N_2$.

|  | Percent | | | |
|---|---|---|---|---|
| $CO^2$ | 10 | 20 | 30 | 40 |
| $O^2$ | 19 | 17 | 15 | 12 |
| $N_2^+$ | 71 | 63 | 55 | 48 |

SUMMARY AND DESCRIPTION OF THE INVENTION

It has been discovered that fresh meat can be refrigerated for reasonably long periods of time without impairment of surface color (bloom) or development of slime or odor and without adverse effects on the taste of the cooked meat, when such refrigerated storage or refrigerated shipment is carried out with said meat maintained in a controlled gaseous atmosphere of carbon dioxide ($CO_2$), about 35–75 volume percent; molecular oxygen ($O_2$), about 21–28 volume percent; and the remainder essentially molecular nitrogen ($N_2$), that is the controlled atmosphere is maintained during the period of refrigerated storage or refrigerated shipment.

It is desirable to begin the refrigeration period with a contolled atmosphere of carbon dioxide, at least about 60%; molecular oxygen, at least about 25%; and the remainder essentially molecular nitrogen. It is preferred that during the refrigeration period the carbon dioxide be present in an amount of at least about 40% and the molecular oxygen be present in an amount of at least about 23%.

The refrigerated storage or shipment may be in any of the conventional containers and by any of the conventional procedures, such as, cold room, ship hold, truck, bulk container for shipboard carriage or truck carriage. The meat may be in carcass form, portions, or even in cuts suitable for individual consumption. The meat may be placed in containers such as barrels or plastic bags which are capable of retaining the synthetic atmosphere and these containers then held in the refrigerated space, which space contains normal air atmosphere.

The refrigerated storage or shipment may be at any one of the usual temperatures ranging from about 29° F. to about 40° F. It is preferred to use a temperature of about 30–36° F., and even more a temperature of 30–33° F.

The aforesaid process is applicable to all meats, but is preferred to be used in connection with beef, pork, veal, lamb, mutton, poultry and game.

The aforesaid process is also beneficially used with fresh fish except that the controlled gaseous atmosphere is carbon dioxide, about 20–25 volume percent; molecular oxygen, about 5–10 volume percent; and the remainder essentially nitrogen. Preferably, the controlled atmosphere is carbon dioxide, at least about 23%; molecular oxygen, at least about 7%; and the remainder essentially molecular nitrogen.

DESCRIPTION OF THE WORKING EXAMPLES

Example I

Refrigerated storage of whole chickens.—Six wet-lock cartons of chicken with top icing were purchased. The chickens were killed one afternoon and received the following morning. They were placed immediately in 55-gallon barrels (one carton per barrel) for holding trials. The storage room was held at 32–33 F.

Duplicate barrels each of chicken were held in air, in atmospheres A and B. B barrels were flushed with carbon dioxide only and the A barrels were flushed with both carbon dioxide and oxygen. The atmospheres were periodically adjusted to maintain the carbon dioxide levels and the oxygen levels.

At the end of eleven (11) days of storage, all the barrels were opened and chickens removed for observation and lab analyses. The barrels were reclosed and atmospheres re-adjusted for additional storage.

None of the chicken had any foul odor after eleven (11) days of storage. About half of the top icing was still in the cartons.

On chickens held in air, the fatty tissue was yellow-orange in color and the wing tips and other apparent bruised areas had a bloody-red appearance. The liver and heart tissue was brown in color.

The fatty tissue was yellow colored; the liver and heart tissue more red in color, and discoloration of wing tips and bruises less prominent on chickens held in atmospheres A and B.

After the 11 days, two chickens from each barrel were sent to the laboratory for bacterial counts. Total bacteria and the psychrophiles (bacteria which multiply at low temperatures) were determined as colonies per square centimeter, standard plate count. The two main psychrophile species were Pseudomonas sp. and Achromobacter sp. The results are shown in Table 1.

TABLE 1

| Atmosphere | (Col./cm.$^2$) [a] | |
|---|---|---|
| | Total bacteria | Psychrophiles |
| Air | 34,125 | 18.5 |
| A | 30,375 | 10.0 |
| B | 33,400 | 14.3 |

[a] Average of 4 samples.

There was a dramatic reduction in the psychrophilic bacterial counts with synthetic atmospheres, especially the A atmosphere. The differences between the two synthetic atmospheres may have been due to higher $CO_2$ content in the A atmosphere.

Little difference was noted in the total bacterial counts between atmospheres A and B.

Two chickens from each barrel were held an additional two (2) days at 39–40° in a refrigerator. After 2 days, the control chickens had a foul odor whereas the chickens previously held in atmospheres A and B had no odor and maintained a good appearance. The results of laboratory analyses of these chickens are shown in Table 2.

TABLE 2

| Previous atmosphere | (Col./cm.$^2$) [a] | | Acid degree [a] |
|---|---|---|---|
| | Total bacteria | Psychrophiles | |
| Air | 39,875 | 26.0 | 2.56 |
| A | 37,800 | 16.8 | 0.90 |
| B | 41,975 | 17.8 | 0.56 |

[a] Average of 4 samples.

After the additional storage at 39–40° F., the psychrophilic bacterial count was much lower on chickens held in atmospheres A and B. Total bacterial count was nearly the same on all chickens.

A marked reduction in acid degree values of the fat were evident with chickens held in synthetic atmospheres. Fat degeneration was less in atmosphere B than in atmosphere A, but both were well below rancidity sensitivity of people. Sensitive people will detect rancidity at acid degree values of about 1.5. Most people will detect off-flavor at acid degree values of 2.0 or higher.

Chickens from the synthetic atmosphere containers were cooked and eaten by several persons and none reported and undesirable off-flavors. Chickens from both atmospheres were boiled in unsalted water and no off-flavor was detected.

After a 21-day storage period at 32–33° F. the test was terminated. At this time, the control chickens were extremely putrid and foul smelling. The chickens were extremely slimy and the fat yellow-orange in color. The liver and heart tissue was brown in color and the liver tissue was deteriorating.

The chickens held in synthetic atmospheres were not slimy, the fat was still yellow in color and the over-all appearance was as good as fresh chicken.

After 21 days of storage, the internal organs of chickens in atmosphere A and the air control maintained a more red color. Internal tissue of chickens held in atmosphere B were especially dark brown in color.

Two chickens from each of the 21-day period tests were analyzed for bacterial counts and rancidity. The results are shown in Table 3.

TABLE 3

| Atmosphere | (Col./cm.$^2$) [a] | | Acid degree [a] |
|---|---|---|---|
| | Total bacteria | Psychrophiles | |
| Air | 84,425 | 39.0 | 1.98 |
| A | 43,450 | 16.0 | 0.78 |
| B | 43,860 | 22.5 | 0.65 |

[a] Average of 4 samples.

Both synthetic atmospheres gave dramatic reductions in fat degeneration and marked control of psychrophilic bacterial growth and total bacterial count.

After the 21-day storage period, three chickens from each of the synthetic atmosphere containers were kept in air at 33° F. for 2 days and then an additional 3 days in a refrigerator at 40° F. After this period, 2 chickens from each of the containers were analyzed for bacteria and rancidity. (There were no air control chicken at this time as they were rotten after the 21-day storage period.) The evaluations are shown in Table 4.

TABLE 4

| Previous atmosphere | (Col./cm.$^2$) [a] | | Acid degree [a] |
|---|---|---|---|
| | Total bacteria | Psychrophiles | |
| A | 53,500 | 31.0 | 1.25 |
| B | 51,650 | 26.5 | 1.01 |

[a] Average of 4 samples.

The acid degree value was approaching a detectable rancidity level for the A chickens after the 5 days in air.

Atmosphere A (an embodiment of the invention):

(1) The barrels were charged with a synthetic atmosphere "A" composed of 60% carbon dioxide, 25% molecular oxygen ($O_2$), and 15% molecular nitrogen.

(2) The atmosphere was analyzed daily. On the third day, the carbon dioxide content had decreased to 46%; the oxygen was at 25%.

The carbon dioxide drifted down to 35% on the 11th day when sample chckens were removed from the barrels.

The oxygen content dropped to 21% on day 7 and held this level until sample chickens were removed on the 11th day.

(3) The median carbon dioxide level for the 11 days was 43%; the median oxygen level for the 11 days was 24%.

(4) After the removal of the sample chickens after 11 days, additional carbon dioxide and oxygen was added to the barrels providing a 44% carbon dioxide content and a 22% oxygen content.

(5) The carbon dioxide content and the oxygen content held almost constant up to the test termination at 21 days, with the final analysis having 43% carbon dioxide and 22% oxygen.

Atmosphere B (which corresponds to about the Finnish research, supra, at 40% carbon dioxide):

(6) Barrels were charged with a synthetic atmosphere "B" composed of 49% carbon dioxide, 12% oxygen, and 39% nitrogen.

(7) On the third day, the carbon dioxide content was 41% and the oxygen content was 11%. The carbon dioxide decreased to 35% on the 11th day.

(8) The median carbon dioxide for the 11-day period was 40%. The oxygen held rather constant at about 12% during the 11-day period.

(9) After the removal of the sample chickens on the 11th day, the carbon dioxide, and oxygen, were adjusted to 40% carbon dioxide and 12% oxygen.

(10) The oxygen content slowly increased to 13.5% at the test termination of 21 days.

The carbon dioxide decreased to 33% at the test termination of 21 days, having a median of 38%.

Example II

Refrigerated storage of pork portions.—Chilled fresh pork which was slaughtered on the 9th and cut on the 10th, was purchased on the 10th. Hind legs and loins were used for this test. The meat was placed into 55 gallon drums the same day as purchased. Half of the meat in each drum was wrapped in parchment paper and half was left naked. A bottle of water with a cloth wick was placed in each drum to maintain high relative humidity. After placing the meat in the drums, the drums were closed and flushed with the appropriate gases.

Duplicates of each atmosphere were prepared. Refrigerated storage was at 32–33° F.

After a 14-day storage period the drums were opened momentarily for the removal of a portion of the meat for evaluations of comparative appearance, odor, flavor, bacterial counts and fat rancidity.

After 14 days of storage, pork held in the A atmosphere had the best overall appearances. The fatty tissue was the desired white, and the meat portion was a desirable bright red. No off-odor was evident before or during cooking and the meat flavor was normal.

Pork held in the B atmosphere was in a similar condition as the A atmosphere except the meat was more brown color than red color. Pork held in air had a slightly spoiled odor and some yellowish-green discoloration at the cut surfaces. The meat was red in color and the fatty tissue was white.

The results of the rancidity tests and bacterial counts are shown in Table 5.

TABLE 5

| Atmosphere | (Col./cm.$^2$) [a] | | Acid degree [a,b] |
|---|---|---|---|
| | Total bacteria | Psychrophiles | |
| Air | 23,333 | 13 | 0.15 |
| B | 22,533 | 12 | 0.14 |
| A | 23,675 | 15 | 0.17 |

[a] Average of 4 samples.
[b] An acid degree value of 1.5% can be detected by very sensitive people and an acid degree value of 2.0% can be detected by most people.

Most of the pork sample was placed in a refrigerator for an additional 3 days to observe shelf life. Pork stored in both A and B atmospheres was still in good condition after 3 days at 40° F. in air. No slime, off-odor or discoloration was evident. Red coloration of the pork held in the B atmosphere developed during this holding period. The air control pork had a foul smell, it was slimy and greenish-yellow color had developed on the meat and fat surfaces.

The results of the laboratory analyses of bacterial counts and fat rancidity after the 3-day shelf life test are shown in Table 6.

TABLE 6

| Previous atmosphere | (Col./cm.$^2$) [c] | | Acid degree [c] |
|---|---|---|---|
| | Total bacteria | Psychrophiles | |
| Air | 69,000 | 35 | 0.70 |
| A | 51,900 | 28 | 0.43 |
| B | 44,500 | 27 | 0.42 |

[c] Average of 3 samples.

During the 3-day holding period at 40° F. the advancement in number of bacterial and rancidity development were significantly reduced in the synthetic atmospheres storage.

After 21 days of controlled storage the remainder of the pork was removed from the barrels. At this time the air-control pork was covered with yellowish-green discoloration on the surface, the meat was extremely slimy and it had a very foul, sour odor.

The pork held in A atmosphere was free of discoloration. The meat was red in color and the fat was white, no slime was evident nor was any off-odor evident.

Pork held in the B atmosphere was comparable to A except the meat was more brown color instead of red.

No differences were evident between wrapped and unwrapped meat in any of the treatments.

Bacterial counts and rancidity values are shown in Table 7.

TABLE 7

| Atmosphere | (Col./cm.;)[c] | | Acid degree [c] |
|---|---|---|---|
| | Total bacteria | Psychrophiles | |
| Air | 133,500 | 65 | 1.60 |
| A | 83,620 | 42 | 0.88 |
| B | 81,770 | 51 | 1.00 |

[c] Average of 3 samples.

The 21-days storage pork was held for 3 days in air at 40° F. to observe shelf life. After the 3-day period, pork previously held in atmospheres A and B still had excellent appearance, smell and taste after cooking. No slimy feel or greenish-yellow color developed during this period.

The results of the laboratory analyses of bacterial counts and fat rancidity after the additional 3 days at 40° F. were as shown in Table 8.

TABLE 8

| Previous atmosphere | (Col./cm.$^2$)[d] | | Acid degree value, percent [d] |
|---|---|---|---|
| | Total bacteria | Psychrophiles | |
| A | 93,300 | 75 | 1.34 |
| B | 77,600 | 62 | 0.81 |

[d] Average of 2 samples.

Atmosphere A (an embodiment of the invention):

(1) The initial synthetic atmosphere was 67% carbon dioxide, 25% oxygen, and remainder nitrogen.

(2) Over the 14-day storage period the carbon dioxide content decreased steadily to 36%. The oxygen content fell quickly to 23% and held at that level for the remainder of the period. The median content was carbon dioxide, 47%, and oxygen, 23%.

(3) After the 14-day samples were withdrawn, the atmosphere was adjusted to 66% carbon dioxide and 26% oxygen.

(4) The final composition after the 21st day, 7 days in the second period, was 42% carbon dioxide, 26% oxygen and remainder nitrogen. During the final 7 days, the median content was 50% carbon dioxide and 26% oxygen.

Atmosphere B:

(5) The initial synthetic atmosphere was 48% carbon dioxide, 9% oxygen and the remainder nitrogen.

(6) Over the 14-day storage period the carbon dioxide content decreased steadily to 20% and the oxygen content increased gradually (caused by air leakage into the container) to 15%. The median content was 44% carbon dioxide and 9% oxygen.

(7) For the final period of controlled storage, the atmosphere was adjusted to 47% carbon dioxide and 5% oxygen.

(8) The final composition after the 21st day was 29% carbon dioxide, 11% oxygen, and the remainder nitrogen. The median content during the final 7 days was 43% carbon dioxide and 7% oxygen.

Comment: The results indicate that pork can be held in excellent condition in synthetic atmosphere for 3 weeks even at 32–33° Fahrenheit. (Recommended commercial shipping temperature is 28–29° Fahrenheit.) Meat in A atmosphere had the advantage of better appearance, i.e., red color, over meat in B atmosphere. Rancidity had not reached objectional levels in either synthetic atmosphere after 3 weeks of storage.

Example III

Lamb storage trial.—Storage trial with fresh lamb was conducted, using 12 lamb loins and 10 lamb legs. The lamb was purchased at 11:00 a.m. and was placed in the storage chambers at 2:00 p.m. and synthetic atmospheres were established by 3:00 p.m. Meat temperatures were 38–40° F. when placed in the chambers and the storage room air was 33–34° F. for the storage period. Bottles of water with a cloth wick were placed in each chamber to provide high relative humidity.

Two loins and 2 legs each were placed in each of the 4 chambers containing synthetic atmospheres and 2 loins and one leg each were placed in two chambers containing air atmosphere.

Duplicate chambers each were prepared for air and for A and for A and B atmospheres. The desired atmospheres were periodically adjusted to the proper level by additions of the appropriate gases.

After a fifteen (15) day storage period, the chambers were opened and a portion of the lamb removed for evaluations. The chambers were then reclosed and the desired atmospheres re-established for an additional storage period.

The air control lamb had a foul odor and was covered with a greenish-yellow slime after 15 days in storage.

Lamb held in A and in B atmospheres was in excellent condition and had good appearance. No marked differences were evident in the appearance of the meat in these atmospheres.

Samples were sent to a laboratory for fat rancidity analyses and bacterial counts and the results are shown in Table 9.

TABLE 9

| Atmosphere | (Col./cm.²)[1] | | Acid degree value, percent[1] |
|---|---|---|---|
| | Total bacteria | Psychrophiles | |
| Air | 88,037 | 713 | 0.76 |
| A | 53,775 | 415 | 0.24 |
| B | 68,413 | 525 | 0.43 |

[1] Average of 4 samples.

Both A and B atmospheres provided a marked reduction in bacterial count and advancement of fat rancidity when compared to the air-control. However, meat in A atmosphere was superior to the meat held in B atmosphere.

Lamb which was sampled immediately after the initial storage period was placed in a refrigerator at 40° F. and held 5 additional days to observe shelf life (except the air control which was already rotten after the 15-day storage period). Lamb held in the A and B atmospheres was not spoiled, even after the shelf life test. Samples were again sent to a laboratory for bacterial counts and fat rancidity analyses with the results as shown in Table 10.

TABLE 10

| Previous atmosphere | (Col./cm.²) | | Acid degree value, percent |
|---|---|---|---|
| | Total bacteria | Psychrophiles | |
| [1] A | 162,500 | 698 | 0.62 |
| [2] B | 167,500 | 800 | 0.94 |

[1] Average of 4 samples.
[2] Average of 3 samples.

Even though bacterial counts and the acid degree values had increased beyond that of the air-control after 15 days of storage, the meat was not foul smelling, slimy, or discolored.

The controlled storage trial was terminated after a 22-day storage period and the remainder of the lamb was removed for observation and evaluation. The air control lamb was extremely foul smelling and covered with greenish-yellow slime.

Lamb held in the A and B atmospheres was free from any foul odor and slime. The red meat tissue was markedly brown in color in the B atmosphere as compared to the A atmosphere. Likewise, the internal meat color and the attached kidney tissue was more brown in color in the B atmosphere.

Samples taken immediately after the 22-day controlled storage period were again sent to a laboratory for bacterial counts and fat rancidity measurements with the results shown in Table 11.

TABLE 11

| Atmosphere | (Col./cm.²)[1] | | Acid degree value, percent[1] |
|---|---|---|---|
| | Total bacteria | Psychrophiles | |
| Air | 428,333 | 3,316 | 2.70 |
| A | 211,875 | 1,512 | 1.05 |
| B | 240,000 | 1,300 | 0.98 |

[1] Average of 4 samples.

After 22 days of controlled storage, the reduction in bacterial counts and acid degree values by the A and B atmospheres as compared to the air control was very striking. Lamb stored in A atmosphere had a superior appearance.

With the exception of the rotten air control samples, lamb samples were held an additional 4 days at 40° F. in a refrigerator to observe shelf life. Samples were sent to a laboratory for final bacterial counts and fat rancidity measurements after the 4-day period with the results shown in Table 12.

TABLE 12

| Treatment | (Col./cm.²)[1] | | Acid degree value, percent[1] |
|---|---|---|---|
| | Total bacteria | Psychrophiles | |
| A | 415,500 | 1,019 | 1.43 |
| B | 373,000 | 1,063 | 1.51 |

[1] Average of 4 samples.

The values for bacteria and fat rancidity were comparable and the appearance of the meat was comparable. Even with what appears to be high bacterial counts, the meat was not foul smelling or slimy. The microflora was apparently changed so that those bacteria predominating did not produce slime or a putrid odor.

Conclusion: The results of this test indicate that fresh lamb can be held for at least 3 weeks in A or B atmospheres. Both storage life and shelf life were markedly extended over air storage. A atmosphere enhanced the appearance of the meat during storage by maintaining the red color as compared to a more brown color of meat stored in B atmosphere.

Atmosphere A (an embodiment of the invention):

(1) The initial synthetic atmosphere was 56% carbon dioxide, 19% oxygen, and the remainder nitrogen.

(2) At the third day, the atmosphere was adjusted to 43% carbon dioxide, 25% oxygen and remainder nitrogen.

(3) Until the 15th day when the containers were opened, the oxygen content held uniformly at about 24% and the carbon dioxide content was roughly 43%.

(4) On the 15th day, the atmosphere was 39% carbon dioxide, 24% oxygen, and the remainder nitrogen.

(5) After the containers had been samples, the atmosphere was adjusted to 65% carbon dioxide, 23% oxygen and remainder nitrogen. On the 21st day, the carbon dioxide had drifted down to 42% and the oxygen had held at about 21%.

Atmosphere B:

(1) The initial synthetic atmosphere was 64% carbon dioxide, 5% oxygen, and remainder nitrogen.

(2) At the 3rd day, the oxygen had increased to about 7% and the carbon dioxide had decreased to about 53%. The carbon dioxide was adjusted to 63% and the oxygen became 6%.

(3) On the 15th day the carbon dioxide dropped to 44%, with a median of 52%; the oxygen drifted up to 10% with a median of 8%.

(4) After the container had been sampled, the atmosphere was adjusted to 55% carbon dioxide, 40% oxygen and the remainder nitrogen. On the 21st day, the carbon dioxide was about 45% after a gradual decline; and the oxygen was about 9% after a gradual increase.

Thus, having described the invention, what is claimed is:

1. In the process of refrigerated storage or refrigerated shipment of fresh meat, the improvement which consists essentially of maintaining said meat in a controlled gaseous atmosphere of carbon dioxide, about 35–75 volume percent; molecular oxygen, about 21–28 volume percent; and the remainder essentially molecular nitrogen during the period of controlled storage or shipment.

2. The process of claim 1 wherein said carbon dioxide is present in an amount of at least about 40% and said oxygen is present in an amount of at least about 23%.

3. The process of claim 1 wherein said refrigeration begins with a controlled atmosphere of carbon dioxide, at least about 60%; molecular oxygen, at least about 25%; and the remainder essentially molecular nitrogen.

4. The process of claim 1 wherein said refrigeration temperature is about 30–33° F.

5. The process of claim 1 wherein said meat is beef, pork, veal, lamb, mutton, poultry or game.

References Cited

UNITED STATES PATENTS

| | | | |
|---|---|---|---|
| 3,102,779 | 9/1963 | Brody | 99—189 |
| 3,648,474 | 3/1972 | Moline | 99—194 |
| 3,508,881 | 4/1970 | Habenaver | 99—189 |

OTHER REFERENCES

Western Meat Industry, September 1971, pp. 25, 29, Pohja et al.

NORMAN YUDKOFF, Primary Examiner

H. H. BERNSTEIN, Assistant Examiner

U.S. Cl. X.R.

426—418, 524